(12) United States Patent
Nogueira (10) Patent No.: US 10,040,233 B2
(45) Date of Patent: Aug. 7, 2018

(54) ACTUATOR FOR A MOLDING SYSTEM (71) Applicant: Husky Injection Molding Systems Ltd., Bolton (CA)

(72) Inventor: Joaquim Martins Nogueira, Everett (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 82 days.

(21) Appl. No.: 14/763,981

(22) PCT Filed: Jan. 21, 2014

(86) PCT No.: PCT/CA2014/050039
§ 371 (c)(1),
(2) Date: Jul. 28, 2015

(87) PCT Pub. No.: WO2014/127469
PCT Pub. Date: Aug. 28, 2014

(65) Prior Publication Data
US 2015/0367549 A1 Dec. 24, 2015

Related U.S. Application Data

(60) Provisional application No. 61/766,204, filed on Feb. 19, 2013.

(51) Int. Cl.
*B29C 45/66* (2006.01)
*B29C 45/64* (2006.01)
(Continued)

(52) U.S. Cl.
CPC .......... *B29C 45/66* (2013.01); *B29C 45/1761* (2013.01); *B29C 45/1781* (2013.01);
(Continued)

(58) Field of Classification Search
CPC . B29C 45/1761; B29C 45/20; B29C 45/1781; B29C 45/1764; B29C 45/1752
(Continued)

(56) References Cited

U.S. PATENT DOCUMENTS 5,249,951 A 10/1993 Leonhartsberger et al.
5,858,422 A 1/1999 Brams
(Continued)

FOREIGN PATENT DOCUMENTS

DE 10337785 B3 11/2004
EP 0300223 A2 1/1989
(Continued)

OTHER PUBLICATIONS

PCT International Search Report; Cuerrier, Pierre; dated Feb. 17, 2014; 3 pages.
European search report, dated Jan. 23, 2017, 7 pages.

*Primary Examiner* — Joseph S Del Sole
*Assistant Examiner* — Thu Khanh T Nguyen (57) ABSTRACT

An actuator (100) for a molding system (900) is disclosed. The actuator (100) includes a linear actuator (102). The linear actuator (102) is configured to move a payload (160) relative to a support structure (170). The linear actuator (102) is connectable to the support structure (170) and the payload (160). The actuator (100) also includes a first compensator (104). The first compensator (104) is configured to compensate for a relative misalignment between the linear actuator (102) and the payload (160). The actuator (100) further includes a second compensator (106). The second compensator (106) is configured to compensate for a relative misalignment between the linear actuator (102) and the support structure (170).

12 Claims, 9 Drawing Sheets

(51) Int. Cl.
*B29C 45/20* (2006.01)
*B29C 45/17* (2006.01)

(52) U.S. Cl.
CPC ............ *B29C 45/20* (2013.01); *B29C 45/641* (2013.01); *B29C 2045/1752* (2013.01); *B29C 2045/1763* (2013.01); *B29C 2045/1764* (2013.01); *B29C 2045/1792* (2013.01); *B29C 2045/642* (2013.01); *Y10T 74/18576* (2015.01)

(58) Field of Classification Search
USPC .......................... 425/595, 451.9; 100/258 A
See application file for complete search history.

(56) References Cited

U.S. PATENT DOCUMENTS

| | | |
|---|---|---|
| 5,888,560 A | 3/1999 | Naderhirn |
| 5,922,370 A | 7/1999 | Ziv-Av |
| 6,328,553 B1 | 12/2001 | Joyner et al. |
| 7,168,946 B2 * | 1/2007 | Koike ................ B29C 45/1761 425/451.9 |
| 7,186,106 B2 | 3/2007 | Kato et al. |
| 7,491,050 B2 | 2/2009 | Dieno et al. |
| 8,814,552 B2 | 8/2014 | Fujita et al. |
| 2015/0044325 A1 | 2/2015 | Kato |

FOREIGN PATENT DOCUMENTS

| | | |
|---|---|---|
| EP | 0504580 A2 | 2/1992 |
| EP | 1958751 A1 | 8/2008 |
| JP | H0911276 A | 1/1997 |

\* cited by examiner

ACTUATOR FOR A MOLDING SYSTEM

TECHNICAL FIELD

Non-limiting embodiments disclosed herein generally relate to an actuator for a molding system and a molding system including an actuator.

BACKGROUND

Molding is a process by virtue of which a molding system forms a molded article from a molding material. A molding process, such as an injection molding process, can form various molded articles. For example, an injection molding process can form a preform suitable for subsequent blow molding into a final shaped container from polyethylene terephthalate (PET material).

A typical molding system may include (among other things) an injection unit, a clamp assembly, a mold assembly, and a molding material distributor, e.g. a hot runner.

Sometimes, several vendors may sell the injection unit, the clamp assembly, the mold assembly, and the molding material distributor separately. Other times, a single vendor may sell the injection unit, the clamp assembly, the mold assembly, and the molding material distributor combined.

SUMMARY

In accordance with a first aspect disclosed herein, there is provided an actuator for a molding system. The actuator includes a linear actuator. The linear actuator is configured to move a payload relative to a support structure. The linear actuator is connectable to the support structure and the payload. The actuator further includes a first compensator. The first compensator is configured to compensate for relative misalignment between the linear actuator and the payload. The actuator further includes a second compensator. The second compensator is configured to compensate for relative misalignment between the linear actuator and the support structure.

In accordance with a second aspect disclosed herein, there is provided a molding system. The molding system includes a clamp assembly. The clamp assembly includes a first platen, a second platen, and a third platen. The molding system further includes an actuator. The actuator includes a linear actuator, a first compensator, and a second compensator. The linear actuator is configured to move the second platen between the first platen and the third platen. The first compensator is configured to compensate for relative misalignment between the linear actuator and the second platen. The second compensator is configured to compensate for relative misalignment between the linear actuator and the third platen.

In accordance with a third aspect disclosed herein, there is provided a molding system. The molding system includes a clamp assembly. The clamp assembly includes a stationary platen and a movable platen. The molding system further includes an actuator. The actuator includes a linear actuator, a first compensator, and a second compensator. The linear actuator is configured to move the movable platen relative to the stationary platen. The first compensator and second compensator are configured to cooperate to prevent, at least partially, the transmission of bending stress and strain to the linear actuator.

In accordance with a fourth aspect disclosed herein, there is provided an injection unit. The injection unit includes an injection rear housing. The injection unit further includes an injection front housing. The injection unit further includes an actuator. The actuator includes a linear actuator, a first compensator, and a second compensator. The linear actuator is configured to move the injection front housing relative to the injection rear housing. The first compensator and second compensator are configured to cooperate to prevent, at least partially, the transmission of bending stress and strain to the linear actuator.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of an actuator for use in an injection molding system. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
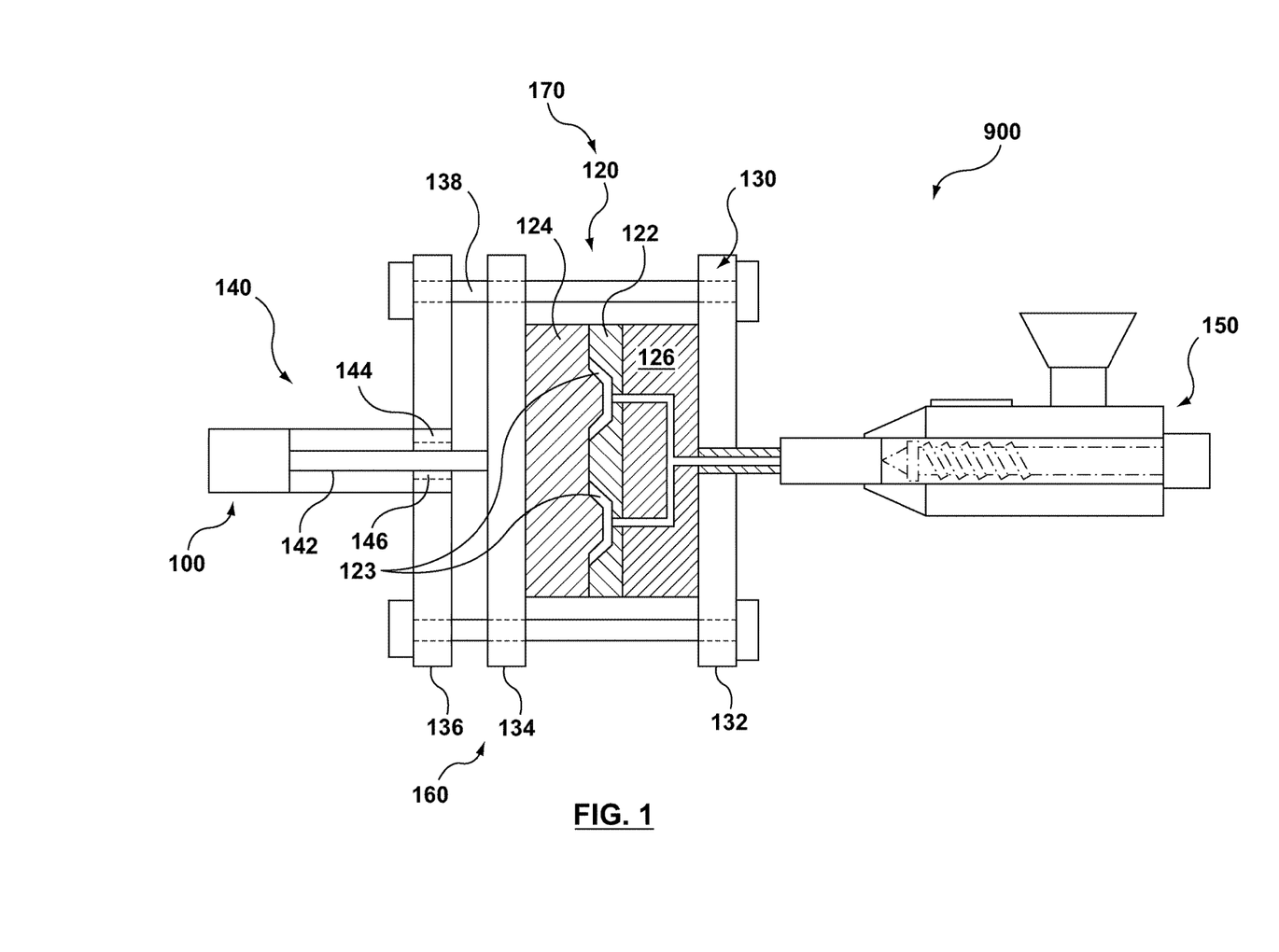
FIG. 1 depicts a schematic representation of a molding system according to a first non-limiting embodiment.

FIG. 1 depicts a schematic representation of a molding system 900 according to a non-limiting embodiment. The molding system 900 is an injection molding system. However, other molding systems are also contemplated such as, for example, a compressing molding system, etc. The molding system 900 includes (but is not limited to): (i) a clamp assembly 130, (ii) an injection unit 800, (iii) a molding material distributor 126, (iv) a mold assembly 120, and (v) an actuator 100.

The clamp assembly 130 includes (but is not limited to): (i) a first platen 132, (ii) a second platen 134, (iii) a third platen 136, (iv) tie bars 138, and (v) a clamp 140. The first platen 132 is a stationary platen that is stationary relative to the second platen 134 and the third platen 136. The second platen 134 is a movable platen that is located between the first platen 132 and the third platen 136. The second platen 134 is configured to be movable between the first platen 132 and the third platen 136. The first platen 132 is stationary in the sense that it does not move independently, as does the second platen 134. The third platen 136 is an end platen that is stationary relative to the first platen 132 and the second platen 134. The tie bars 138 extend between the first platen 132 and the third platen 136. The second platen 134 and the tie bars 138 are slidably connected, such that the second platen 134 is slidable relative to the tie bars 138.

The third platen 136 is associated with the clamp 140. Actuation of the clamp 140 applies a clamping force to push the second platen 134 toward the first platen 132 and pull the tie bars 138 toward the third platen 136, such that the clamping force is applied across the first platen 132 and the second platen 134. The third platen 136 may be substantially stationary relative to the first platen 132 and the second platen 134 in the sense that a misalignment of the clamping force may cause some movement of the third platen 136 relative to the first platen 132.

The clamp 140 includes (but is not limited to): (i) a clamp column 142, (ii) a clamp cylinder 144, and (iii) a clamp piston 146. The clamp column 142 generally has hollow cylindrical shape. The second platen 134 and the clamp column 142 are connected together. The clamp cylinder 144 defines a cylinder bore (not separately numbered). The third platen 136 is associated with the clamp cylinder 144. The third platen 136 and the clamp cylinder 144 may be connected together. The third platen 136 and the clamp cylinder 144 may also be integrally formed. The clamp piston 146 is movably located within the cylinder bore. The clamp piston 146 defines a piston bore (not separately numbered). The piston bore slidably receives the clamp column 142, i.e. the clamp column 142 passes through the piston bore as the payload 160 moves. The clamp piston 146 and the clamp column 142 are configured to cooperate to block movement of the clamp column 142 and apply the clamping force across the first platen 132 and the second platen 134.

The injection unit 800 is configured to inject, under pressure, a molding material. The molding material distributor 126 is configured to receive the molding material from the injection unit 800 and distribute the molding material to a mold cavity 123 defined by the mold assembly 120. The molding material distributor 126 is associated with the first platen 132. The mold assembly 120 includes a stationary mold portion 122 and a movable mold portion 124. The stationary mold portion 122 is associated with the first platen 132. The movable mold portion 124 is associated with the second platen 134. Movement of the second platen 134 closes the mold assembly 120. The stationary mold portion 122 and the movable mold portion 124 cooperate to define the mold cavity 123.

The actuator 100 moves a payload 160 relative to a support structure 170. The payload 160 includes (but is not limited to): (i) the second platen 134, (ii) the clamp column 142, and (iii) the movable mold portion 124. The support structure 170 includes (but is not limited to): (i) the third platen 136, (ii) the tie bars 138, (iii) the third platen 136, and (iv) the clamp cylinder 144.

In operation, the actuator 100 may stroke the second platen 134 from a retracted condition of the actuator 100 toward the first platen 132 to an extended condition of the actuator 100, such that the mold assembly 120 is in a closed position. At the extended condition of the actuator 100, the clamp 140, via actuation of the clamp piston 146, may apply the clamping force to the clamp column 142. The clamping force urges the clamp column 142 and the second platen 134 toward the first platen 132. Furthermore, the pull of the third platen 136 away from the first platen 132 stretches the tie bars 138, such that the clamping force squeezes the mold assembly 120 together. The clamping force squeezes the mold assembly 120 together as the injection unit 800 injects the mold cavity 123 with the molding material.

Figure 2:
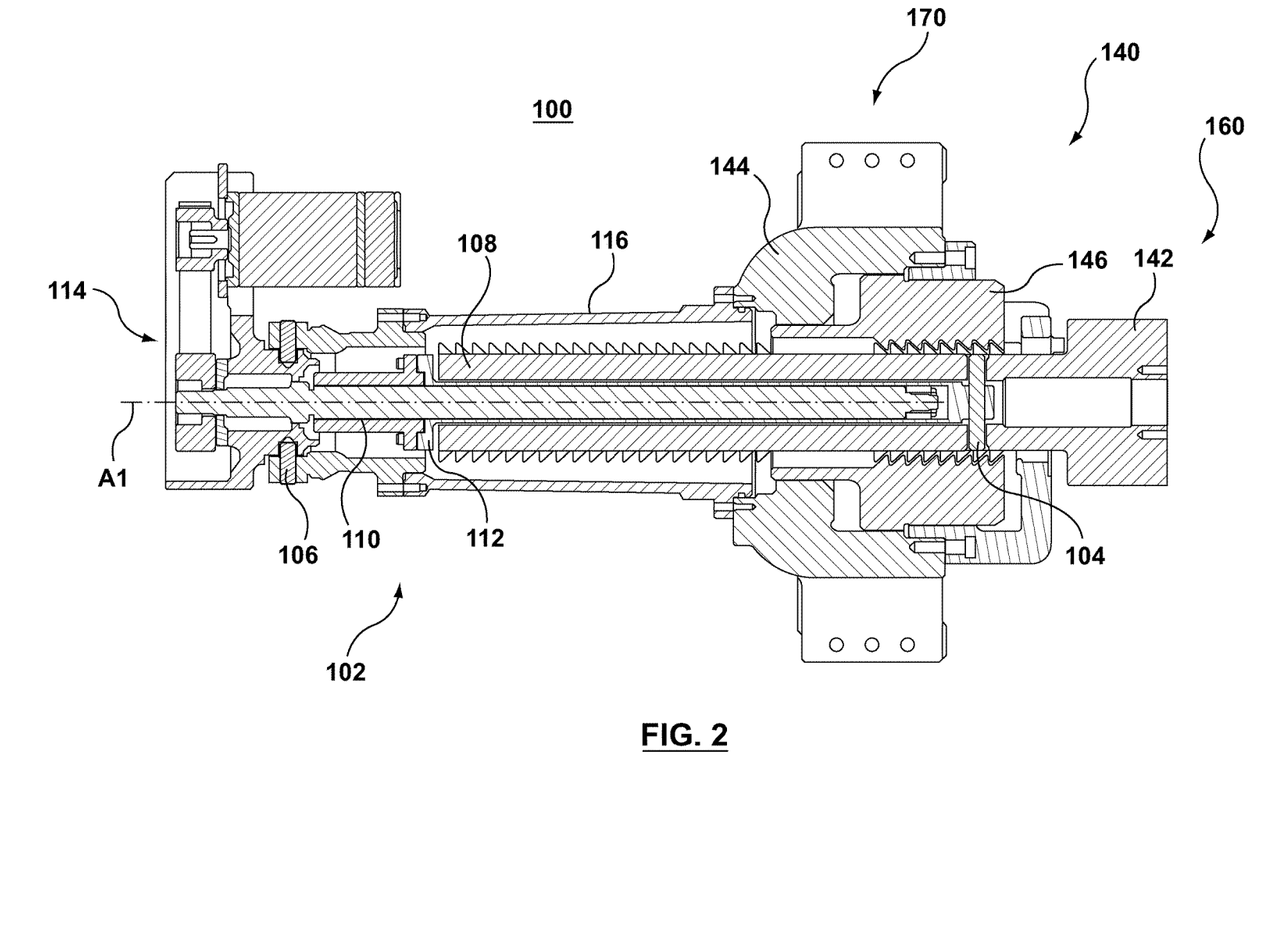
FIG. 2 depicts a top cross section view of an actuator of the molding system of FIG. 1, the actuator being in a retracted condition.
Figure 3A:
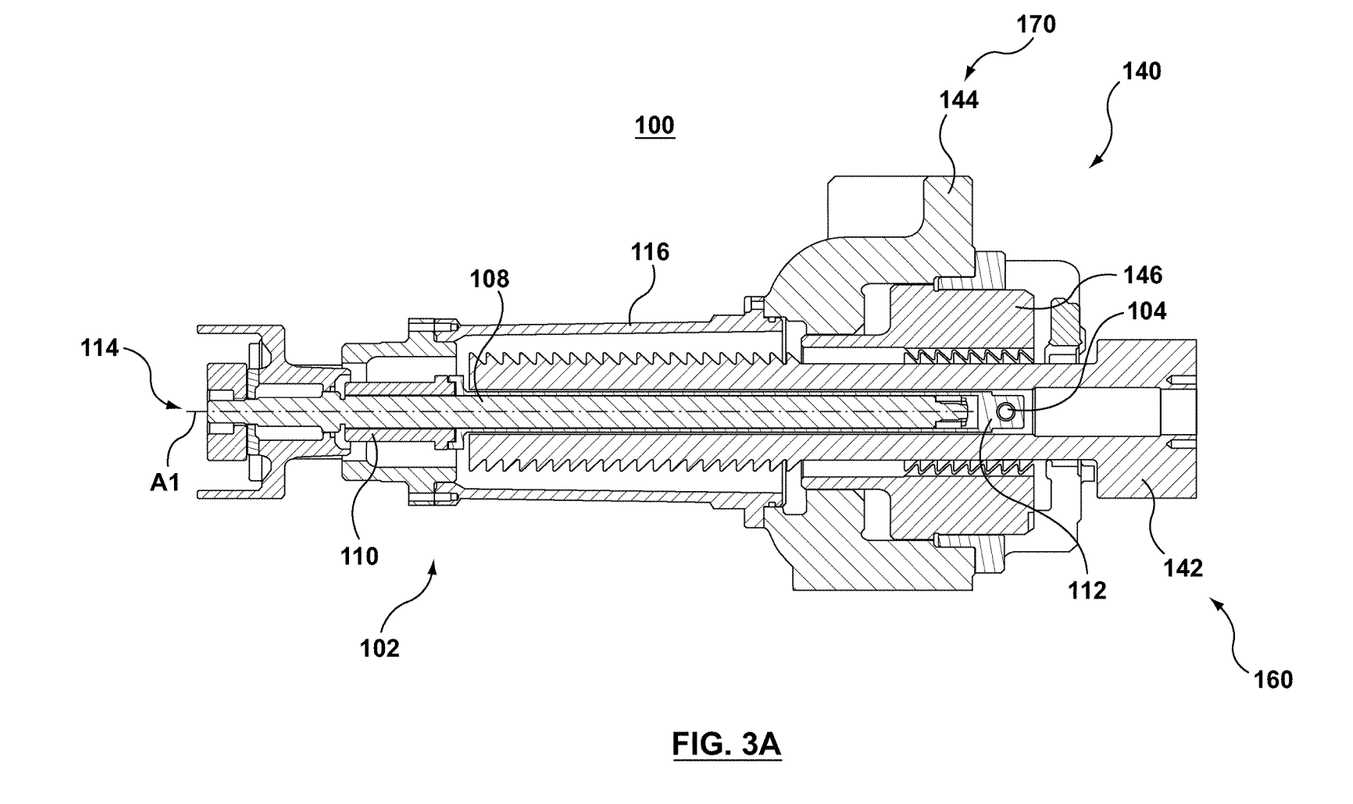
FIG. 3A depicts a side cross section view of the actuator of FIG. 2.
Figure 3B:
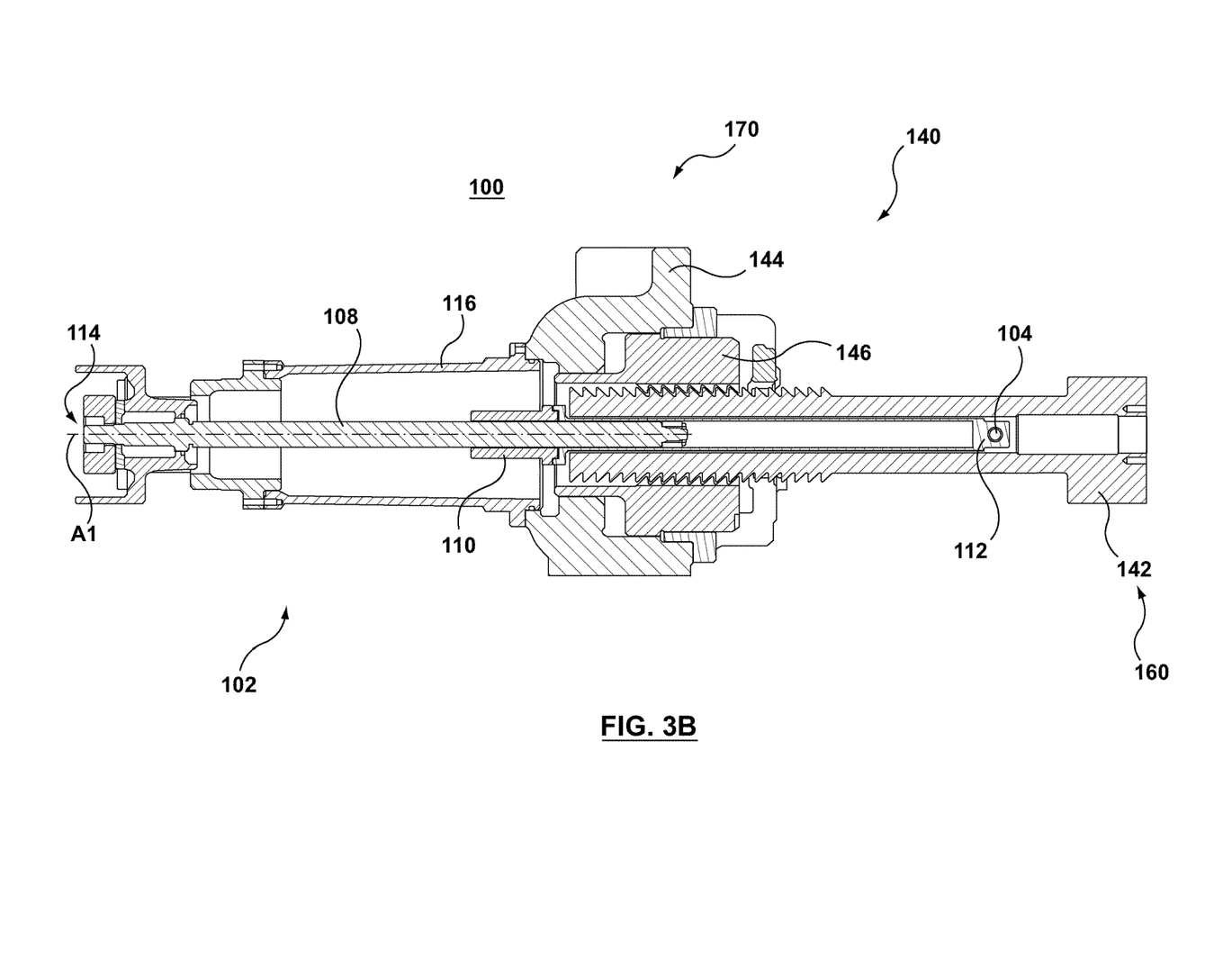
FIG. 3B depicts a side cross section view of the actuator of the molding system of FIG. 1, the actuator being in an extended condition.

FIG. 2 depicts a top cross section representation of the actuator 100 in a retracted condition. The retracted condition corresponds to a mold open condition. FIG. 3A depicts a side cross section view of the actuator 100 and the clamp 140 of FIG. 2. FIG. 3B depicts a side cross section view of the actuator 100 and the clamp 140 of FIG. 2, the actuator 100 being in an extended condition.

The actuator 100 includes a linear actuator 102 configured to move the payload 160 relative to the support structure 170. The linear actuator 102 includes a drive unit 114 including an electric motor. However, other means for driving the actuator are also contemplated such as, for example, a hydraulic circuit, etc. The actuator 100 further includes a first compensator 104 and a second compensator 106. The first compensator 104 is configured to compensate for a relative misalignment between the linear actuator 102 and the payload 160. The first compensator 104 connects the linear actuator 102 to the payload 160. The second compensator 106 is configured to compensate for a relative misalignment between the linear actuator 102 and the support structure 170. The second compensator 106 connects the linear actuator 102 to the support structure 170.

The linear actuator 102 further includes a threaded member 108 and a threaded collar 110 engaged with the threaded member 108. The threaded member 108 is configured rotate about an operational axis A1. The drive unit 114 is configured to rotate the threaded member 108 about the operational axis A1. The threaded collar 110 is configured to engage with the threaded member 108, such that the threaded member 108 causes the threaded collar 110 to move along the operational axis A1 with rotation of the threaded member 108. According to a non-limiting embodiment, the linear actuator 102 is a ball screw type linear actuator.

The linear actuator 102 further includes a hollow member 112 extending from the threaded collar 110 along the operational axis A1. The hollow member 112 is at least partially located within the clamp column 142. The first compensator 104 connects together the hollow member 112 and the clamp column 142. When the actuator 100 is in the retracted condition, threaded member 108 is at least partially located within the hollow member 112.

The support structure 170, as depicted, further includes a housing 116. The housing 116 extends between the clamp cylinder 144 and the drive unit 114. The linear actuator 102 is at least partially located within the housing 116. The second compensator 106 connects together the housing 116 and the drive unit 114.

As depicted, the first compensator 104 includes a first joint (not separately numbered). The first joint pivotally connects together the payload 160 and the linear actuator 102. The second compensator 106 includes a second joint (not separately numbered). The second joint pivotally connects together the support structure 170 and the linear actuator 102.

Figure 4:
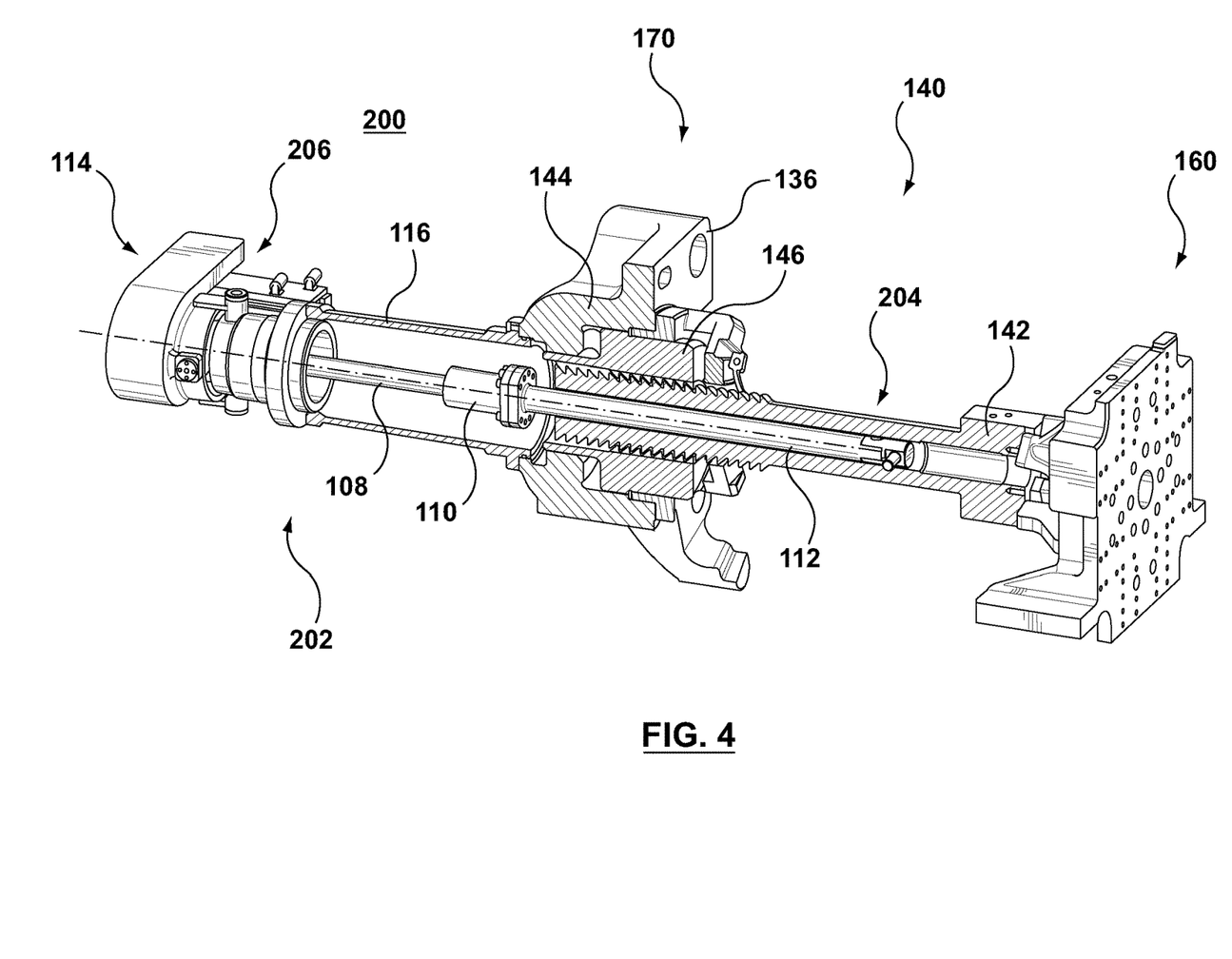
FIG. 4 depicts a partial perspective view of an actuator according to a second non-limiting embodiment.

FIG. 4 depicts a partial perspective view of an actuator 200 according to a non-limiting embodiment. The actuator 200 includes a first compensator 204 configured to compensate for relative misalignment between the linear actuator 202 and the payload 160. The actuator 200 further includes a second compensator 206 configured to compensate for relative misalignment between the linear actuator 202 and the support structure 170. The actuator 200 is substantially the same as the non-limiting embodiment depicted in FIG. 3B, but the first compensator 204 includes a first universal joint (not separately numbered), and the second compensator 206 includes a second universal joint (not separately numbered).

According a non-limiting embodiment (not depicted), at least one of the first compensator and the second compensator may include a bendable connector.

Figure 5:
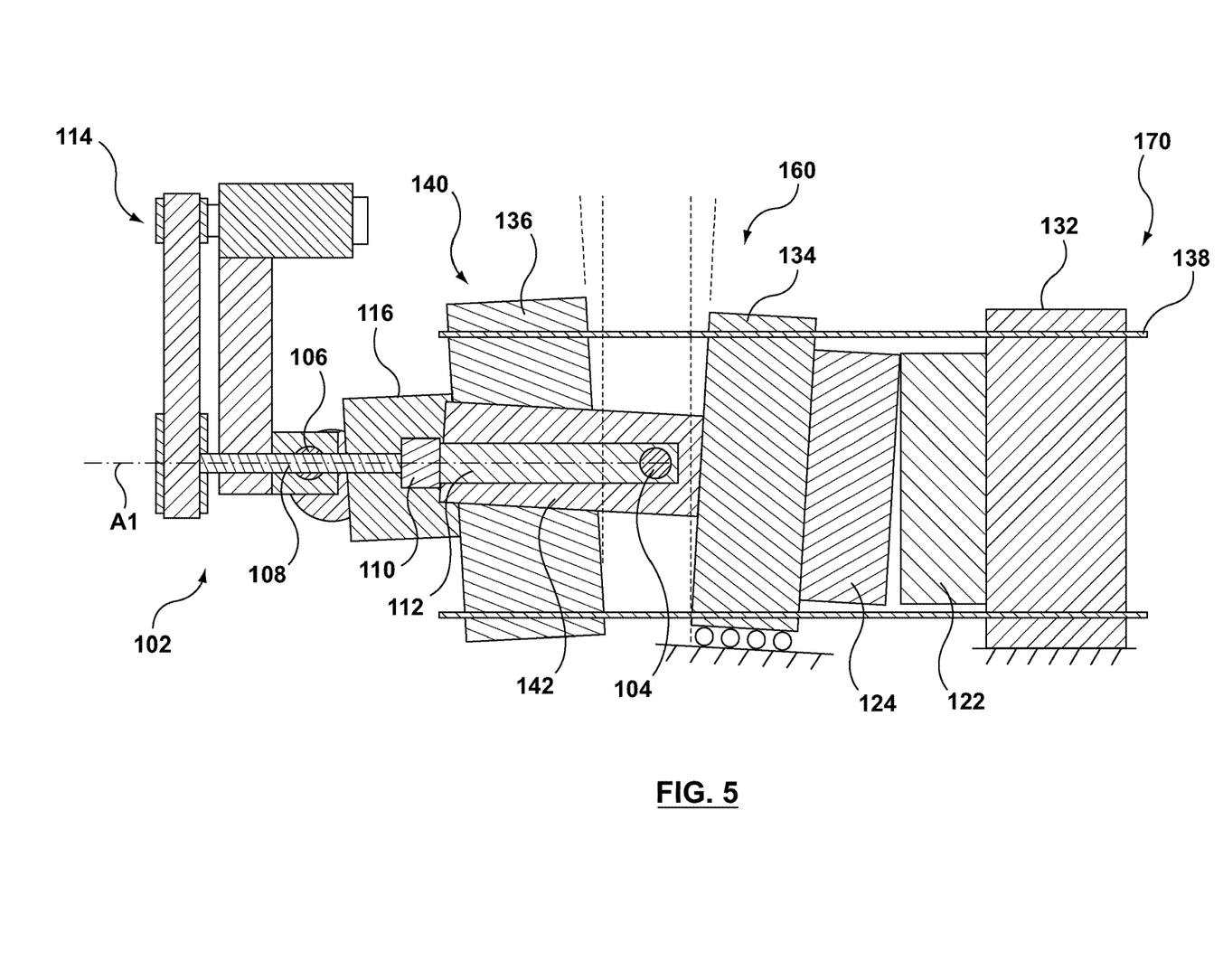
FIG. 5 depicts a schematic representation of an actuator, in use, according to a first non-limiting embodiment.

FIG. 5 depicts a schematic representation of the actuator 100, in use. With reference to FIG. 5, the linear actuator 102 includes the drive unit 114, the threaded member 108, the threaded collar 110, and the hollow member 112. In operation, the drive unit 114 provides motive power for rotating the threaded member 108 about the operational axis A1. Therefore, the threaded collar 110 can move towards and away from the first platen 132. In turn, the threaded collar 110 can move the payload 160 towards and away from the first platen 132. As depicted, the second platen 134 is in a mold closed position and the clamp 140 is transmitting the clamping force across the first platen 132 and the second platen 134. The payload 160 includes the clamp column 142, the second platen 134, and the movable mold portion 124. The support structure 170 includes the first platen 132, the tie bars 138, the third platen 136, the clamp 140, and the housing 116. As depicted, misalignment of the clamping force has caused a relative pivoting movement of the linear actuator 102 and the payload 160 about the first compensator 104. Misalignment of the clamping force further causes a relative pivoting movement of the linear actuator 102 and a substantially stationary part (not separately numbered) of the support structure 170 about the second compensator 106. The substantially stationary part includes the third platen 136, the clamp 140, and the housing 116. Therefore, in use, the first compensator 104 and the second compensator 106 can prevent, at least partially, the transmission of bending stress and strain to the linear actuator 102.

Figure 6:
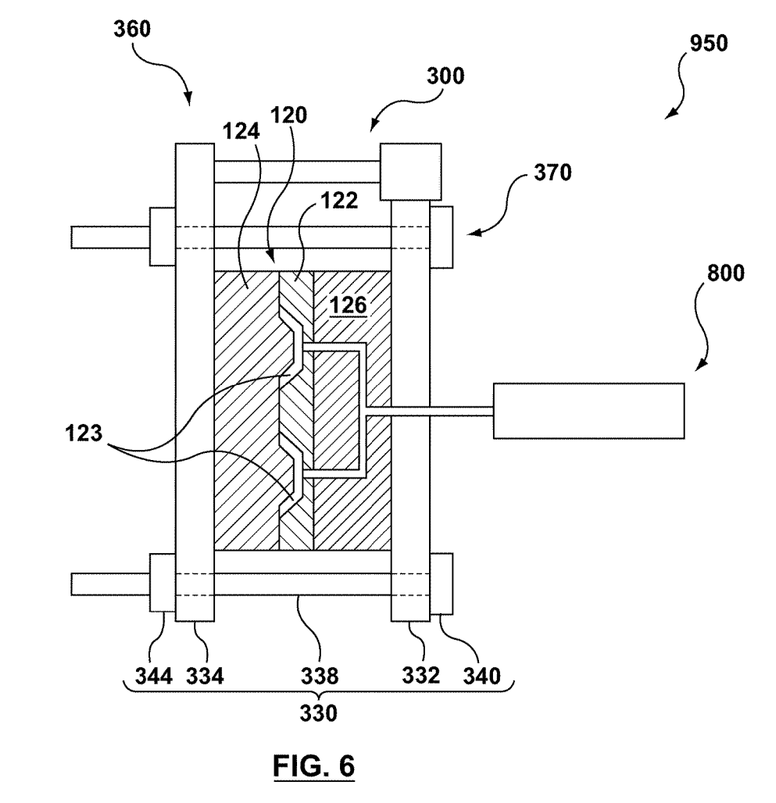
FIG. 6 depicts a schematic representation of a molding system according to a second non-limiting embodiment.

In a second non-limiting embodiment of a molding system 950, referring now to FIG. 6, there is depicted a schematic representation. The molding system 950 includes (but is not limited to): (i) a clamp assembly 330, (ii) an injection unit 800, (iii) a molding material distributor 126, (iv) a mold assembly 120, and (v) an actuator 300.

The clamp assembly 130 includes (but is not limited to): (i) a stationary platen 332, (ii) a movable platen 334, (iii) tie bars 338, (iv) a clamp 340, and (v) a lock 344. The stationary platen 332 is stationary relative to the movable platen 334. The tie bars 338 extend between the stationary platen 332 and the movable platen 334. The movable platen 334 and the tie bars 338 are slidably connected, such that the movable platen 334 is slidable relative to the tie bars 338. The lock 344 is configured to lock, in use, the position of the movable platen 334 relative to the stationary platen 332. The clamp 340 is configured to apply a clamping force, in use, to the tie bars 338, such that the clamping force is applied across the stationary platen 332 and the movable platen 334.

The actuator 300 moves a payload 360 relative to a support structure 370. The payload 360 includes (but is not limited to) the movable platen 334 and the movable mold portion 124. The support structure 370 includes (but is not limited to) the stationary platen 336 and the tie bars 338.

In operation, the actuator 300 may stroke the movable platen 334 from an extended condition of the actuator 300 toward the stationary platen 332 to a retracted condition of the actuator 300, such that the mold assembly 120 is in a closed position. At the closed position of the mold assembly 120, lock 344 is engaged to lock the position of the movable platen 334 such that the movable platen 334 no longer moves relative to the stationary platen 332. The clamp 340 is then engaged to apply the camping pressure across the stationary platen 332 and the movable platen 334. The clamping force squeezes the mold assembly 120 together as the injection unit 800 injects the mold cavity 123 with the molding material.

Figure 7:
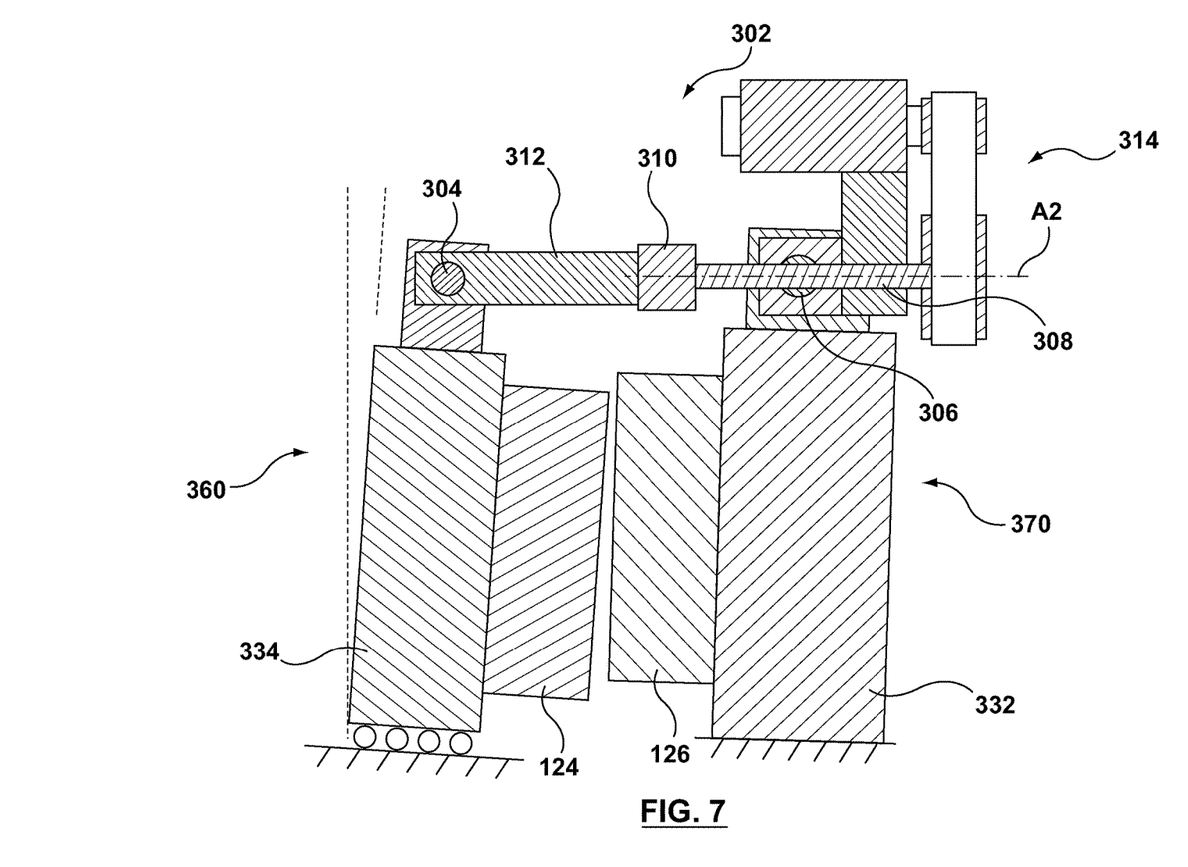
FIG. 7 depicts a schematic representation of an actuator, in use, according to a second non-limiting embodiment.

FIG. 7 depicts a schematic representation of the actuator 300, in use. The actuator 300 includes (and is not limited to): (i) a linear actuator 302, (ii) a first compensator 304, and (iii) a second compensator 306. The first compensator 304 connects the linear actuator 302 to the payload 360. The second compensator 306 connects the linear actuator 302 to the support structure 370. The first compensator 304 and second compensator 306 are configured to cooperate to prevent, at least partially, the transmission of bending stress and strain to the linear actuator 302. The first compensator 304 may compensate for relative movement between the linear actuator 302 and the payload 360. The second compensator 306 may compensate for relative movement between the linear actuator 302 and the support structure 370.

The linear actuator 302 includes a drive unit 314 including an electric motor. The linear actuator 302 further includes a threaded member 308 and a threaded collar 310 engaged with the threaded member 108. The threaded member 308 is configured rotate about an operational axis A2. The drive unit 314 is configured to rotate the threaded member 308 about the operational axis A2. The threaded collar 310 is configured to engage with the threaded member 308, such that the threaded member 308 causes the threaded collar 310 to move along the operational axis A2 with rotation of the threaded member 308. The linear actuator 302 further includes a hollow member 312 extending from the threaded collar 310 along the operational axis A2. The first compensator 304 connects together the hollow member 312 and the movable platen 334. The hollow member 312 is configured to receive the threaded member 308, such that when the actuator 300 is in the retracted condition, threaded member 308 is at least partially located within the hollow member 312.

With reference to FIG. 7, in operation, the drive unit 314 provides motive power for rotating the threaded member 308 about the operational axis A2. Therefore, the threaded collar 310 can move towards and away from the stationary platen 332. In turn, the threaded collar 310 can move the payload 360 towards and away from the stationary platen 332. As depicted, the movable platen 334 is in a mold closed position and the clamping force is applied across the stationary platen 332 and the movable platen 334. In use, the first compensator 304 and the second compensator 306 can prevent, at least partially, the transmission of bending stress and strain to the linear actuator 302.

Figure 8:
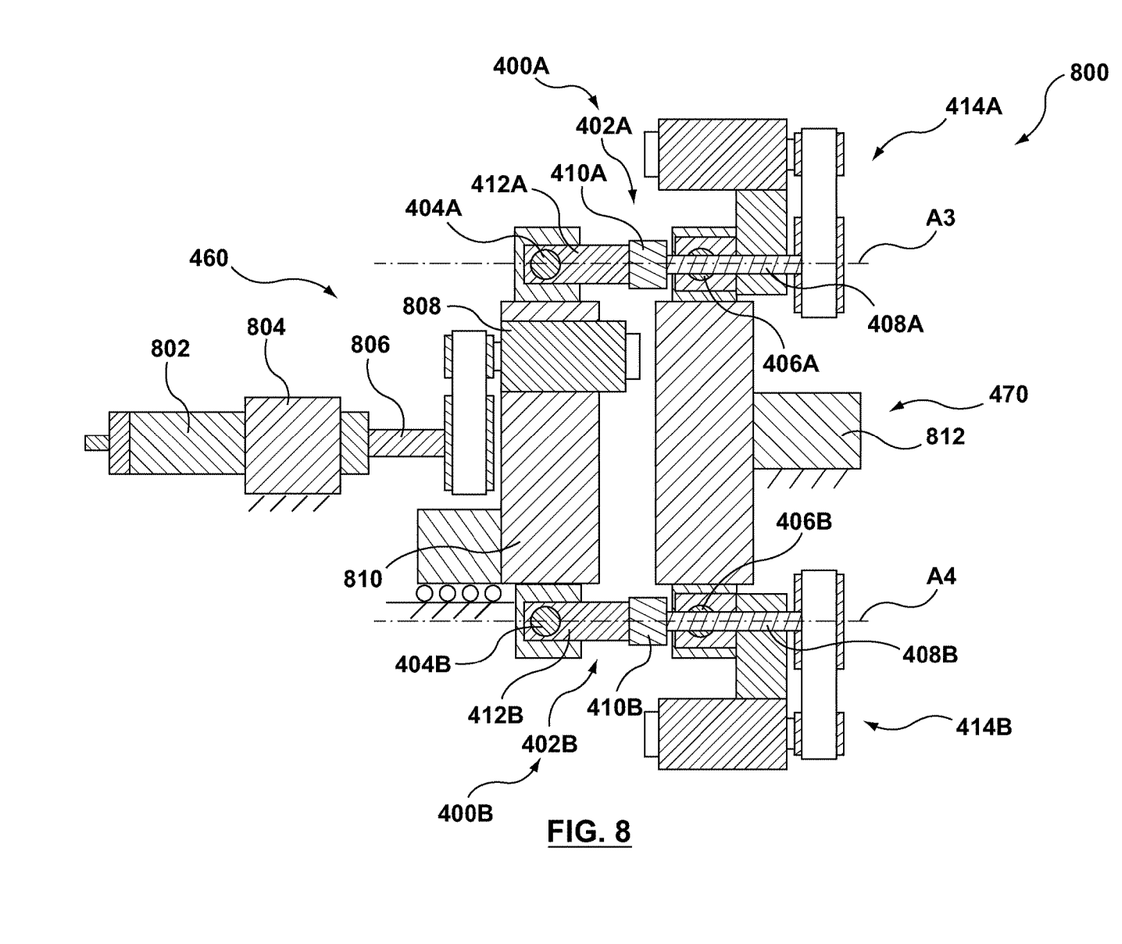
FIG. 8 depicts a schematic representation of an injection unit according to a first non-limiting embodiment.

Referring now to FIG. 8, there is depicted a schematic representation of a first non-limiting embodiment of the injection unit 800. The injection unit 800 is a reciprocating-screw type injection unit. However, other injection units are also contemplated such as, for example, a two-stage type injection unit, etc. The injection unit 800 includes (but is not limited to): (i) a barrel 802, (ii) a feed throat 804, (iii) a feed screw 806, (iv) a screw drive 808, (v) an injection front housing 810, (vi) an injection rear housing 812, and (vii) an actuator 400A, 400B. The barrel 802 is configured to receive a molding material (such as PET or the like) via the feed throat 804. The screw drive 808 is configured to rotate the feed screw 806 about an injection axis (not separately numbered) of the feed screw 806. The screw drive 808 is connected to the injection front housing 810. The feed screw 806 is movably housed in the barrel 802. Furthermore, the feed screw 806 is operatively connected to the screw drive 808. Typically, a root diameter of the feed screw 806 progressively increases along the injection axis in a direction away from the feed throat 804. The injection rear housing 812 is a stationary housing that is stationary relative to the injection front housing 810. The injection front housing 810 is movable housing that is movable relative to the injection rear housing 812 along the injection axis.

FIG. 8 depicts a plurality of actuators 400A, 400B that move, in cooperation, a payload 460 relative to a support structure 470. The payload 460 includes (but is not limited to) the feed screw 806, the screw drive 808, and the injection front housing 810. The support structure 470 includes (but is not limited to) the injection rear housing 812. The actuator 400A, 400B includes (and is not limited to): (i) a linear actuator 402A, 402B, (ii) a first compensator 404A, 404B, and (iii) a second compensator 406A, 406B. The first compensator 404A, 404B connects the linear actuator 402A, 402B to the payload 460. The second compensator 406A, 406B connects the linear actuator 402A, 402B to the support structure 470. The first compensator 404A, 404B and second compensator 406A, 406B are configured to cooperate to prevent, at least partially, the transmission of bending stress and strain to the linear actuator 402A, 402B. The first compensator 404A, 404B may also compensate for relative movement between the linear actuator 402A, 402B and the payload 460. The second compensator 406A, 406B may also compensate for relative movement between the linear actuator 402A, 402B and the support structure 470.

The linear actuator 402A, 402B includes a drive unit 414A, 414B including an electric motor. The linear actuator 402A, 402B further includes a threaded member 408A, 408B and a threaded collar 410A, 410B engaged with the threaded member 408A, 408B. The threaded member 408A, 408B is configured rotate about an operational axis A3, A4. The drive unit 414A, 414B is configured to rotate the threaded member 408A, 408B about the operational axis A3, A4. The linear actuator 402A, 402B further includes a hollow member 412A, 412B extending from the threaded collar 410A, 410B along the operational axis A3, A4. The first compensator 404A, 404B connects together the hollow member 412A, 412B and the injection front housing 810. The hollow member 412A, 412B is configured to receive the threaded member 408A, 408B, such that when the actuator 400A, 400B is in the retracted condition, the threaded member 408A, 408B is at least partially located within the hollow member 412A, 412B.

In operation, the screw drive 808 causes the feed screw 806 to convey the molding material from the feed throat 804 along the injection axis. The molding material is sheared between the flights of the feed screw 806, the screw root, and an inner surface of the barrel 802. Barrel heaters (not shown) may also heat the molding material. As the shear level increases in line with the increasing root diameter, the molding material, gradually, turns into a substantially homogenous melt. The screw drive 808 stops rotation of the feed screw 806 when a desired amount of the molding material accumulates in a space at a discharge end of the barrel 802. The drive unit 414A, 414B can then provide motive power for rotating the threaded member 408A, 408B about the operational axis A3, A4. Therefore, the threaded collar 410A, 410B can move the payload 460 away from the injection rear housing 812. Movement of the payload 460 forces the feed screw 806 forward along the injection axis, injecting a desired amount of the melt. In use, the first compensator 404A, 404B and the second compensator 406A, 406B can prevent relative movements of the components of the injection unit 800 from, at least partially, transmitting bending stress and strain to the linear actuator 402A, 402B. Furthermore, in use, the first compensator 404A, 404B and the second compensator 406A, 406B can prevent deformations of the components of the injection unit 800 such as, for example, bending of at least one of the injection front housing 810 and the injection rear housing 812, from, and at least partially, transmitting bending stress and strain to the linear actuator 402A, 402B.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. An actuator (100, 200, 300, 400A, 400B) for a molding system (900, 950), the actuator (100, 200, 300, 400A, 400B) comprising:
    a linear actuator (102, 202, 302, 402A, 402B) configured to move a payload (160, 360, 460) relative to a support structure (170, 370, 470), the linear actuator (102, 202, 302, 402) being connectable to the support structure (170, 370, 470) and the payload (160, 360, 460);
    a first compensator (104, 204, 304, 404A, 404B) configured to compensate for relative misalignment between the linear actuator (102, 202, 302, 402A, 402B) and the payload (160, 360, 460), the first compensator connects the linear actuator to the payload, the first compensator includes a first universal joint configured to connect the linear actuator to the payload; and
    a second compensator (106, 206, 306, 406A, 406B) configured to compensate for relative misalignment between the linear actuator (102, 202, 302, 402A, 402B) and the support structure (170, 370, 470), the second compensator includes a second universal joint configured to connect the linear actuator to the support structure.

2. The actuator (100, 200, 300, 400A, 400B) of claim 1, wherein the first compensator (104, 204, 304, 404A, 404B) includes:
a first joint, whereby the payload (160, 360, 460) is pivotally connected to the linear actuator (102, 202, 302, 402A, 402B).

3. The actuator of claim 1, wherein the first compensator includes:
a first bendable connector configured to connect the linear actuator to the payload.

4. The actuator (100, 200, 300, 400A, 400B) of claim 1, whereby the support structure (170, 370, 470) is pivotally connected to the linear actuator (102, 202, 302, 402A, 402B).

5. The actuator of claim 1, wherein the second compensator includes:
a second bendable connector configured to connect the linear actuator to the support structure.

6. The actuator (100, 200, 300, 400A, 400B) of claim 1, wherein the linear actuator (102, 202, 302, 402A, 402B) includes:
a threaded member (108, 308, 408A, 408B) configured to rotate about an operational axis (A1, A2, A3, A4); and
a threaded collar (110, 310, 410A, 410B) configured to engage with the threaded member (108, 308, 408A, 408B) such that the threaded member (108, 308, 408A, 408B) causes the threaded collar (110, 310, 410A, 410B) to move along the operational axis (A1, A2, A3, A4) when the threaded member (108, 308, 408A, 408B) rotates about the operational axis (A1, A2, A3, A4).

7. The actuator (100, 200) of claim 1, wherein the support structure (170) includes:
a first platen (132);
a third platen (136);
tie bars (138) extending between the first platen (132) and the third platen (136); and
a clamp cylinder (144) associated with the third platen (136).

8. The actuator (100, 200) of claim 7, wherein the payload (160) includes:
a second platen (134) movable between the first platen (132) and the third platen (136);
a clamp column (142) connected to the second platen (134) and the linear actuator (102, 202); and
a movable mold portion (124) associated with the second platen (134).

9. The actuator (300) of claim 1, wherein the support structure (370) includes:
a stationary platen (332); and
tie bars (338) extending between the stationary platen (332) and a movable platen (334).

10. The actuator (300) of claim 9, wherein the payload (360) includes:
the movable platen (334) slidably movable relative to the tie bars (338); and
a movable mold portion (124) associated with the movable platen (334).

11. The actuator (400A, 400B) of claim 1, wherein the support structure (470) includes:
an injection rear housing (812).

12. The actuator (400A, 400B) of claim 11, wherein the payload (460) includes:
an injection front housing (810);
a screw drive (808) connected to the injection front housing (810); and
a feed screw (806) operatively connected to the screw drive (808).

* * * * *

(12) SUPPLEMENTAL EXAMINATION CERTIFICATE

United States Patent  
Nogueira

(10) Number: US 10,040,233 F1  
(45) Certificate Issued: Aug. 7, 2020

Control No.: 96/000,331  
Primary Examiner: William C. Doerrler

Filing Date: Jul. 16, 2020

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2004/0071809 | 8/2004 | Hsu |

FOREIGN PATENT DOCUMENTS

| | | |
|---|---|---|
| WO | 2012/098745-A1 | 07/2012 |
| CN | 1031673-A | 03/1989 |
| CN | 1489519-A | 04/2004 |